United States Patent [19]

Nix et al.

[11] Patent Number: 4,557,361
[45] Date of Patent: * Dec. 10, 1985

[54] SHIPPING AND INSTALLATION STRAP FOR LINEAR ACTUATOR

[75] Inventors: Richard A. Nix, Utica; Keith V. Leigh-Monstevens, Troy, both of Mich.

[73] Assignee: Automotive Products plc, Warwickshire, England

[*] Notice: The portion of the term of this patent subsequent to Jun. 19, 2001 has been disclaimed.

[21] Appl. No.: 417,336

[22] Filed: Sep. 13, 1982

Related U.S. Application Data

[63] Continuation-in-part of Ser. No. 344,495, Feb. 1, 1982, Pat. No. 4,452,632.

[51] Int. Cl.$^4$ .................. F16D 25/08; F16D 25/12; F15B 15/26
[52] U.S. Cl. .................. 192/85 C; 24/265 R; 60/636; 92/23; 192/91 R
[58] Field of Search ............... 192/85 C, 91 R, 30 R, 192/99 S; 92/15, 26, 29, 23; 60/636; 403/12, 2; 24/16 PB, 17 AP, 265 R

[56] References Cited

U.S. PATENT DOCUMENTS

| | | | |
|---|---|---|---|
| 285,385 | 9/1883 | Brundage | 215/250 X |
| 3,171,526 | 3/1965 | Waclawek | 192/85 C X |
| 3,220,524 | 11/1965 | Puidokas | 192/99 S |
| 3,430,745 | 3/1969 | Randol | 192/99 S X |
| 3,812,942 | 5/1974 | Espenschied et al. | 192/91 R |
| 3,983,983 | 10/1976 | Steiskal et al. | 192/99 S |
| 4,317,470 | 3/1982 | Taylor | 137/71 X |
| 4,426,754 | 1/1984 | Smith et al. | 24/17 AP |
| 4,454,632 | 6/1984 | Nix et al. | 24/16 PB |

FOREIGN PATENT DOCUMENTS 2017802 10/1979 United Kingdom ............ 24/16 PB

Primary Examiner—Rodney H. Bonck
Attorney, Agent, or Firm—Hauke and Patalidis

[57] ABSTRACT

A shipping and installation restraining strap for an actuator such as the hydraulic slave cylinder of a motor vehicle clutch actuating apparatus. The strap comprises a retaining member in the form of a cylindrical cap installed on the end of the actuator output rod and having a substantially hemispherical end portion engaged in a corresponding partially spherical concave recess in the member operated by the actuator, such as the clutch release lever. The other end of the strips is attached to a non-movable portion of the actuator. Each strip has a portion of reduced strength such as to break upon first operation of the actuator. The cylindrical cap is optionally provided with a radially extending disc-like flange seal resiliently engaged with the surface of the clutch actuating lever beyond the edge of the recess, such as to prevent introduction of dirt in the recess.

15 Claims, 19 Drawing Figures

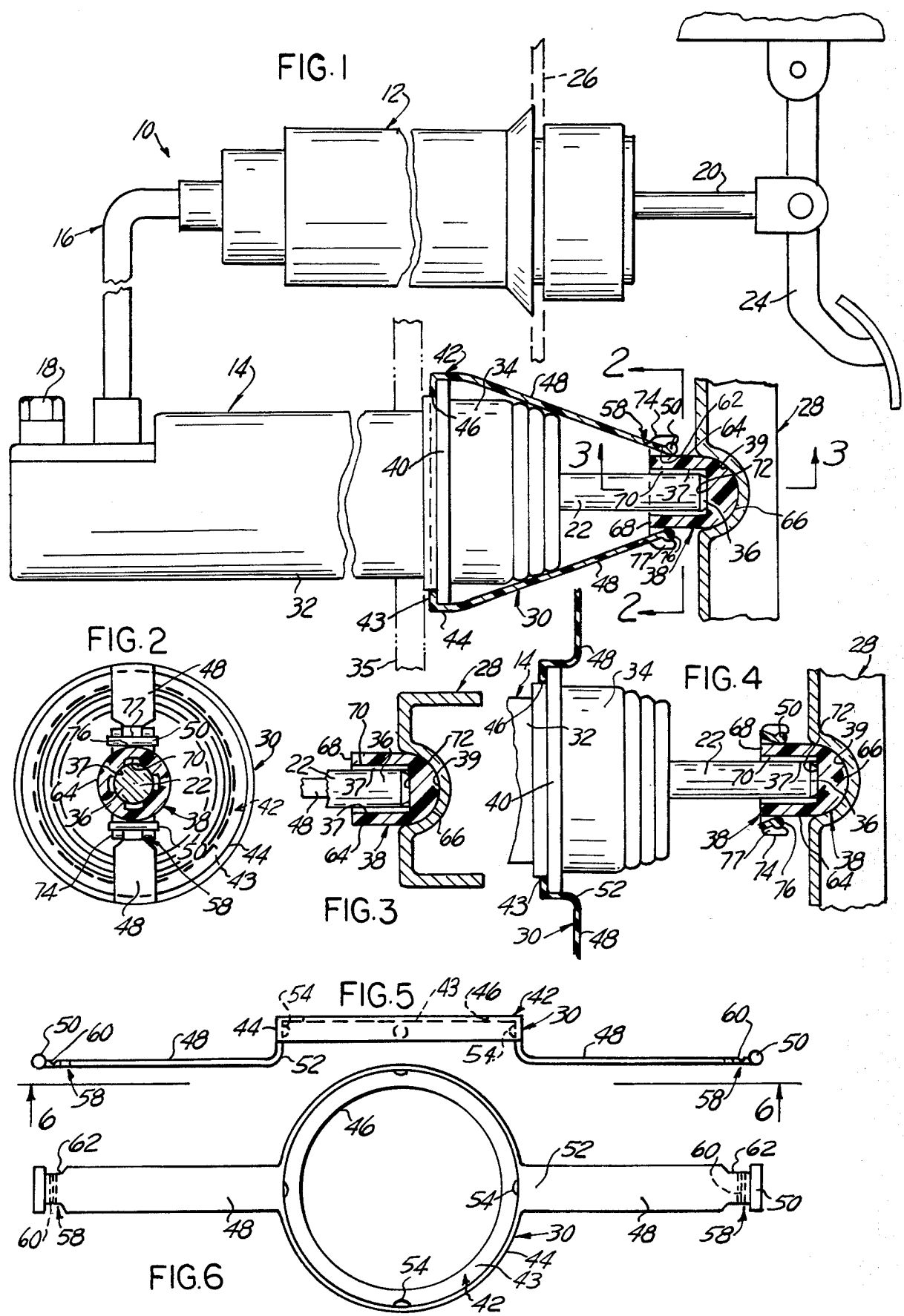

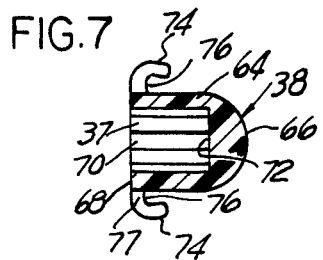
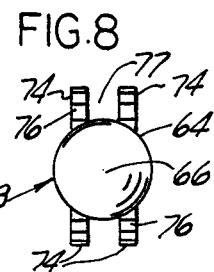
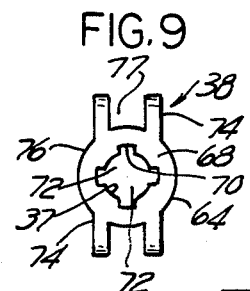
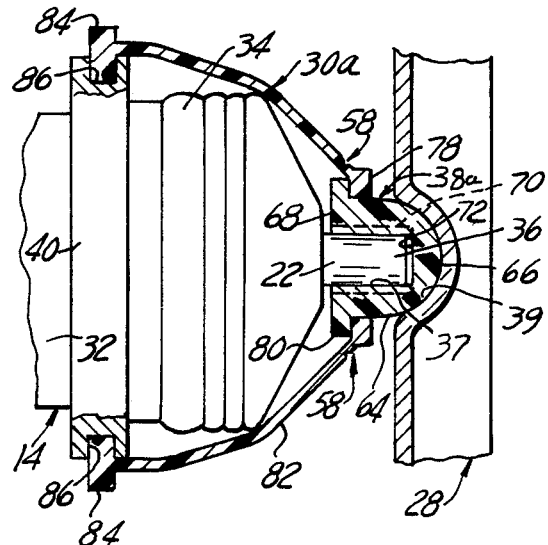
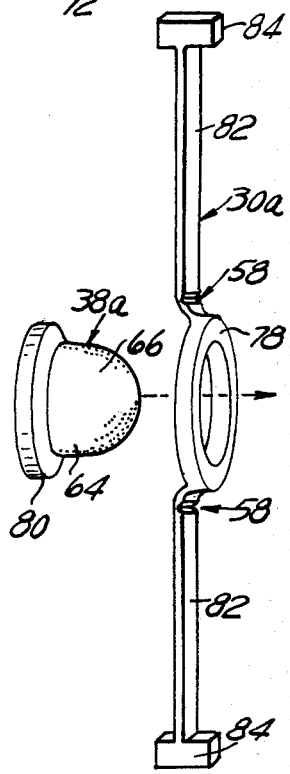
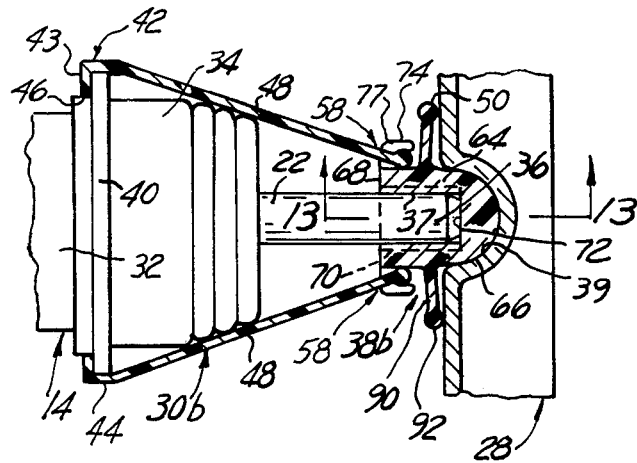
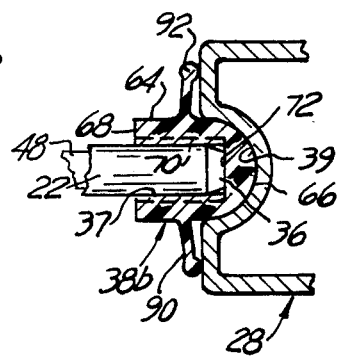

SHIPPING AND INSTALLATION STRAP FOR LINEAR ACTUATOR

CROSS-REFERENCE TO RELATED APPLICATIONS

The present application is a continuation-in-part of application Ser. No. 344,495, filed Feb. 1, 1982, now U.S. Pat. No. 4,454,632 assigned to the same assignee as the present application.

BACKGROUND OF THE INVENTION

The present invention relates to an apparatus and method for shipping and installing a linear actuator. More particularly, the present invention relates to shipping and installations straps for holding in a rectracted position the output member of a linear actuator, such as a hydraulic actuator, during transportation and storage and during installation of the actuator for operation of a mechanism.

Hydraulic actuator apparatus are known for operating a mechanism at a remote location by way of a master cylinder, for example, connected to a slave cylinder installed at the remote location. A conduit interconnects the master cylinder to the slave cylinder, and the hydraulic apparatus is filled with hydraulic fluid such that when the piston of the master cylinder is actuated, the piston of the slave cylinder, and consequently the piston rod or output member, are simultaneously actuated by displacement of the hydraulic fluid from the master cylinder to the slave cylinder through the conduit.

More particularly, it is known to provide such hydraulic apparatus for operating, for example, the release mechanism of a friction clutch. As disclosed in British patent specification No. 1,539,879, and in corresponding applications for United States Letters Patents, Ser. Nos. 911,477, now U.S. Pat. No. 4,407,125, now abandoned and 376,248 which are continuations of application Ser. No. 676,474, now abandoned, and in applications Ser. Nos. 338,165, now abandoned, and 400,276, now abandoned, all assigned to the same assignee as the present application, it is now known to pre-assemble friction clutch hydraulic release apparatus, by filling with hydraulic fluid the master cylinder, the slave cylinder, the conduit interconnecting the cylinders and a reservoir connected to the master cylinder, before shipment of the assembly to a motor vehicle manufacturer, for installation on a motor vehicle. Preferably, the hydraulic apparatus is filled with fluid maintained by a resilient diaphragm disposed in the reservoir of fluid, at a pressure slightly higher than atmospheric pressure to prevent introduction of atmospheric air into the system during transportation, storage and installation. Prior to installation, the piston rod, or output member, projecting from one end of the slave cylinder may become extended such that the over-all length of the slave cylinder, with the piston rod extended, may occupy more space than necessary in the shipping container, the rod may become bent or damaged while in transit or storage or become disconnected from the piston, the pressure of the fluid may drop below atmospheric pressures, thus causing air to be introduced into the hydraulic apparatus, and the slave cylinder piston rod must be manually retracted and held retracted during installation of the apparatus in the motor vehicle.

The principal object of the invention disclosed in prior application Serial No. 344,495 assigned to the same assignee as the present application is to provide a restraining strap for the output member of a linear actuator such as the piston rod of a slave cylinder of a pre-filled sub-assembly comprising a master cylinder, a slave cylinder and a conduit interconnecting the master cylinder with the slave cylinder. The object of the invention is achieved by providing a flexible, preferably plastic, strap having a portion maintaining the slave cylinder piston rod in a retracted position by attaching the end of the piston rod to the housing of the slave cylinder, the strap having appropriate weakened break-away sections defining one or more rupture portions, such that when the piston of the master cylinder is actuated for the first time, thus causing a thrust to be applied to the piston and piston rod of the slave cylinder, the strap is broken and the apparatus is enabled to operate in a normal manner.

SUMMARY OF THE INVENTION

One of the objects of the present invention is also to provide a restraining strap for the output member of a linear actuator such as the piston rod of the slave cylinder of a pre-filled sub-assembly comprising a master cylinder, a slave cylinder and a conduit interconnecting the master cylinder and the slave cylinder, the restraining strap having break-away portions such that, when the piston rod of the slave cylinder is actuated for the first time, the strap is broken and the apparatus is enabled to operate in a normal manner.

Another object of the present invention is to provide a shipping and installation restraining strap more particularly for the piston rod of a slave cylinder adapted to operate a motor vehicle clutch release mechanism having a recess receiving the end of the piston rod, and to provide a separate or separable nosepiece for the slave cylinder piston rod end forming a bearing member interposed between the rod end and the surface of the recess, and arranged such that the nosepiece is made integrally with or attached to the bands or strips of the restraining strap.

A further object of the invention is to provide the bearing-nosepiece with an integral seal member preventing introduction of dirt between the bearing surface of the nosepiece and the surface of the recess in the clutch actuating member.

These and other objects and advantages of the present invention will become apparent to those skilled in the art when the following description of examples of the best modes contemplated for practicing the invention is read in conjunction with the accompanying drawing wherein like reference numerals refer to like or equivalent parts, and in which:

BRIEF DESCRIPTION OF THE DRAWING

FIG. 1 is a schematic illustration of a hydraulic apparatus having a slave cylinder provided with an example of structure for shipping and installation restraining strap according to the present invention and shown partially in section;

FIG. 2 is a cross-section from line 2—2 of FIG. 1;

FIG. 3 is a partial section from line 3—3 of FIG. 1;

FIG. 4 is a partial view similar to FIG. 1 but showing the broken strap after the first operation of the apparatus;

FIG. 5 is a side elevational view of the restraining strap of FIGS. 1-4;

FIG. 6 is a plan elevation view thereof from line 6—6 of FIG. 5;

FIG. 7 is an elevation view, with portion broken away, of the rod end nosepiece associated with the restraining strap of FIGS. 5-6;

FIGS. 8 and 9 are respectively front and rear views of the nosepiece of FIG. 7;

FIG. 10 is a partial view similar to FIG. 1 but showing a modification of the restraining strap according to the present invention;

FIG. 11 is an exploded perspective view of the restraining strap of FIG. 10;

FIG. 12 is a view similar to FIG. 1 but showing a modification of the invention providing a combination restraining strap nosepiece and seal;

FIG. 13 is a partial section along line 13—13 of FIG. 12;

DETAILED DESCRIPTION OF THE PREFERRED EMBODIMENTS

Figure 14:
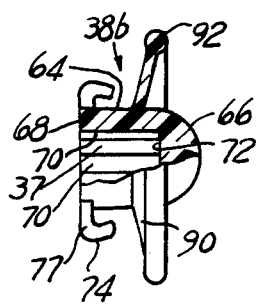
FIGS. 14-16 are respectively side elevation views with portion broken away, and front and rear views of the nosepiece of FIG. 12.

Referring now to the drawing and more particularly to FIG. 1, there is schematically illustrated a hydraulic apparatus assembly 10 comprising a master cylinder 12 hydraulically interconnected to a slave cylinder 14 by means of a conduit 16, in the form of a flexible hose, for example. After assembly of the diverse components, the whole apparatus is filled with a hydraulic fluid under slight pressure and bled to remove air from the apparatus by way of a bleed valve 18, mounted for example on the slave cylinder 14, until all air has escaped from the apparatus. Alternatively, and as disclosed in co-pending application Ser. No. 400,276, atmospheric air is evacuated from the apparatus and the apparatus filled with hydraulic fluid at a pressure slightly higher than atmospheric pressure.

An additional reservoir of hydraulic fluid, not shown, is connected to the master cylinder 12. The reservoir of hydraulic fluid may take the form of a built-in reservoir integral with, or directly attached, to the master cylinder housing, or it may be a remotely located reservoir connected by a conduit to the master cylinder 12. The hydraulic fluid is maintained during transport, storage and installation at a pressure slightly higher than atmospheric pressure by an accumulator consisting, for example, of a resilient diaphragm disposed in the fluid reservoir.

As is well known, any displacement of the master cylinder piston rod 20 causes a corresponding displacement of the piston rod or actuator 22 of the slave cylinder 14, as a result of transferring a portion of the hydraulic fluid from the master cylinder 12 through the conduit 16 to the slave cylinder 14. The piston rod 20, or input member, of the master cylinder 12 may be operated, for example, by the clutch release pedal 24 of a motor vehicle, the master cylinder 12 being installed, for example, below the floorboard 26 of the motor vehicle driver compartment, the slave cylinder 14 being attached on the underframe of the vehicle in an appropriate position such that the end of its piston rod 22 actuates the release mechanism, such as a lever 28, of the motor vehicle friction clutch, not shown.

During assembly of the slave cylinder 14, a shipping and installation strap 30 is installed, according to the present invention, such as to restrain the slave cylinder piston rod 22 from extending beyond a certain limit from the open end of the slave cylinder housing 32. An elastomeric bellows boot 34 has an end affixed to the rim of the cylinder housing 32 and another end elastically engaging a portion of the peripheral surface of the piston rod 22 for the purpose of protecting the covered portion of the piston rod 22 from the ambient and preventing introduction of foreign matter and dirt into the open end of the cylinder housing 32 through which the rod 22 projects. In the structure illustrated, the slave cylinder housing 32 is attached to a bracket 35, or other member, forming part of the clutch bell housing or transmission housing, not shown, and the end 36 of the slave cylinder piston rod or actuator 22 is engaged in the central bore 37 of a nosepiece 38 forming a bearing member between the rod end 36 and a generally hemispherical recess 39 in the clutch release lever 28.

The slave cylinder housing 32 is provided with a peripheral annular flange 40, and the strap 30 has a corresponding annular flange collar 42, FIGS. 1, 5 and 6, comprising an annular flange 43 formed on one side of a cylindrical rim 44 fitting over the housing annular flange 40, the strap annular flange collar 42 forming an opening 46 fitting over the slave cylinder housing 32. A pair of diametrically disposed bands or strips 48 are molded integrally with the annular flange 43 at one of their ends and provided with an integral bar or strut member 50 at their other end. The strap 30 is preferably molded of plastic such as a polyamide (nylon), and the bands or strips 48 are relatively flexible. The strap 30 is molded in the shape illustrated at FIGS. 5 and 6, i.e. with a pre-formed bend 52 proximate the end of each band or strip 48 joined to the rim 44 of the annular flange collar 42. Preferably, a plurality of small projecting nibs 54 are formed on the inner surface of the cylindrical rim 44 for providing a relatively tight elastic fit of the cylindrical rim 44 of the annular flange collar 42 over the slave cylinder flange 40. The other end of each band or strip 48 is provided with a weakened portion 58 where it is integrally molded with the bar or strut member 50, each weakened portion 58 being in the form of a reduced thickness portion as shown at 60, resulting from a surface groove, most clearly shown at FIG. 5, or a reduced width portion, as shown at 62 at FIG. 6, or both.

The nosepiece 38, as best shown at FIGS. 7-9, is in the form of a cylindrical cap having a generally cylindrical body 64 provided on one end with a generally hemispherical face portion 66 and on the other with a flat annular end face 68 through which is disposed the bore 37. The bore 37 is provided with a plurality of longitudinal grooves 70 on its surface, such as to facilitate introduction therethrough of the end 36 of the slave cylinder piston rod 22, the bore 37 terminating in a flat surface 72 against which the face of the end 36 of the piston rod 22 normally engages when the nosepiece 38 is installed over the piston rod end. A pair of symmetrically disposed bifurcated ears 74 integrally radially project from the cylindrical body 64 of the nosepiece 38 proximate the annular end face 68 thereof, and each bifurcated ear 74 is provided with a partially cylindrical notch 76 forming a hook for attachment thereover of the bar or strut member 50 at the end of each band or strip 48, the reduced width portion 62, for example, of the band or strip 48 being disposed within the bifurcation gap 77 of each bifurcated ear 74, as shown at FIGS. 1 and 2. The nosepiece 38 may be made of the same material as the strap 30, or of a different material and, if so desired, it may be made of metal. Whatever the material used for making the nosepiece 38, it is so dimensioned that its hemispherical end face 66 fits within the partially spherical recess 39 in the clutch release lever 28, such as to provide a generally swivelling connection between the slave cylinder piston rod 22 and the clutch release lever 28. The swivelling connection compensates for relative inaccuracy in alignment of the diverse elements, and allows pivoting of the clutch release lever 28 during operation of the clutch mechanism, the hemispherical end face 66 of the nosepiece 38, and the partially spherical recess 39 co-operating for forming a ball and socket bearing arrangement between the end 36 of the piston rod 22 and the clutch release lever 28

After installation of the hydraulic apparatus 10 in a motor vehicle, the first time the clutch release mechanism is actuated by operating the clutch pedal 24, hydraulic fluid is supplied from the master cylinder 12, when the piston rod 20 of the master cylinder is reciprocated, to the slave cylinder 14 through the line or conduit 16, such that the slave cylinder piston rod 22 is extended. Although the weakened portions 58 of the bands or strips 48 of the strap 30 are capable of holding the slave cylinder piston rod 22 in its retracted and centered position during shipping, storage and installation of the hydraulic apparatus 10 in a motor vehicle, the force exerted on the slave cylinder piston during the first operation of the clutch release causes the strap bands or strips 48 to break away from the bar members 50, FIG. 4, when the piston rod 22 is extended, thus subsequently permitting normal operation of the hydraulic apparatus 10.

The present invention is susceptible of various modifications for accomplishing its objects of convenience of shipping and installation of pre-filled hydraulic apparatus. An example of such modification is illustrated at FIGS. 10-11 wherein a shipping and installation strap 30a is illustrated as comprising a ring 78 disposed over a separate cup-shaped piston rod retaining member or nosepiece 38a placed over the end 36 of the piston rod 22 of a slave cylinder 14, FIG. 10. The cylindrical body portion 64 of the nosepiece 38a has a radially extending annular flange 80 engaged with the rear of the ring 78. The ring 78 is provided with diametrally disposed bands or strips 82 each having an integral strut 84 formed on the end thereof, substantially at right angle to the axis of each band or strip 82. The inner end of each strut 84 is introduced in a receiving recess 86 formed in the annular flange 40 disposed proximate the end of the slave cylinder housing 32. A weakened portion 58, for example in the form of a break-away groove, is formed at the junction between the other end of each band or strip 82 and the ring 78 such that, when hydraulic fluid is fed to the slave cylinder 14, thus causing its piston rod 22 to extend, the bands or strips 82 separate at the weakened portions 58 from the ring 78 and free the cup-shaped nosepiece 38a, and consequently the piston rod 22, for normal operation. It can be seen that in this modification of the invention, the nosepiece 38a also acts as the ball portion of a ball and socket bearing member interposed between the end 36 of the piston rod 22 and the clutch release lever 28 provided with a generally hemispherical recess 39 engaged by the hemispherical end 66 of the nosepiece 38a.

Figure 15:
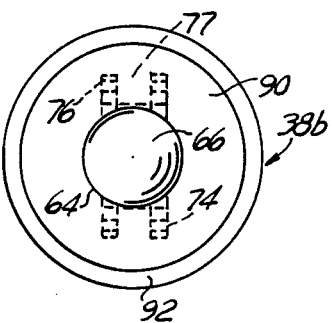
Figure 16:
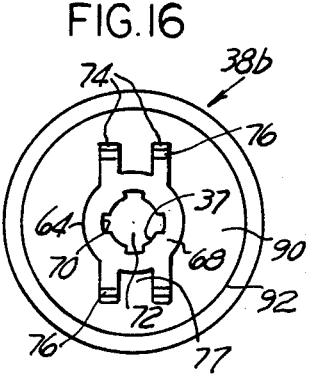

The structure illustrated at FIG. 12 comprises a retaining strap 30b identical to the restraining strap 30 of FIGS. 1-6 combined with a modified nosepiece 38b having a disc-like sealing member 90 integrally formed therewith and projecting in a flange-like fashion from the cylindrical body portion 64 of the nosepiece 38b, and provided with a toroidal integral rim 92. As best shown at FIGS. 14-15, the disc-like sealing member 90, in a relaxed state, is slightly dished towards the hemispherical end face 66 of the nosepiece 38b, such that when the slave cylinder 14 is installed in a motor vehicle for actuating the clutch release lever 28, FIGS. 12-13, the toroidal rim 92 is urged in engagement with the surface of the clutch release lever 28 around the perimeter of the generally hemispherical recess 39 in which is engaged the hemispherical end face 66 of the nosepiece 38b. The disc-like sealing member 90 thus forms an effective seal preventing the introduction of dirt from the ambient and the surroundings between the bearing surfaces formed by the surface of the hemispherical end face 66 and the generally hemispherical recess 39, which could cause rapid wearing of the bearing surfaces in engagement.

Figure 17:
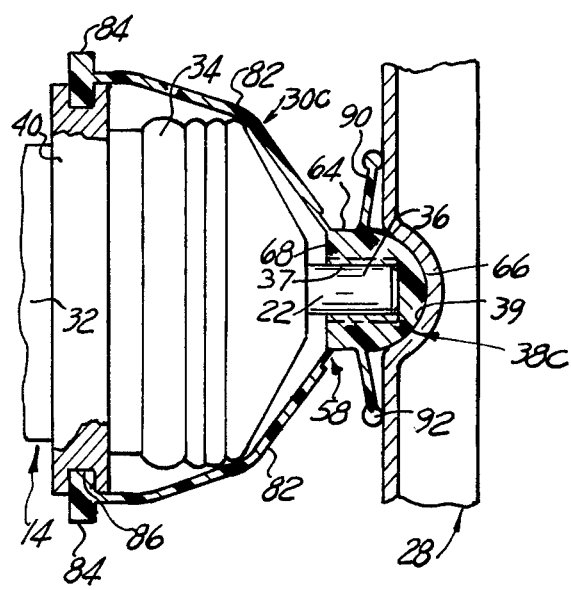
FIG. 17 is a view similar to FIG. 10 but showing a further modification of the invention.
Figure 18:
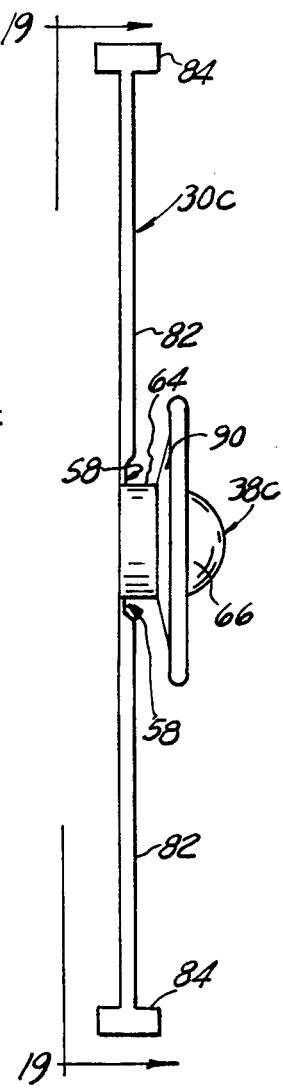
FIG. 18 is a side elevation view of the restraining strap of FIG. 17.
Figure 19:
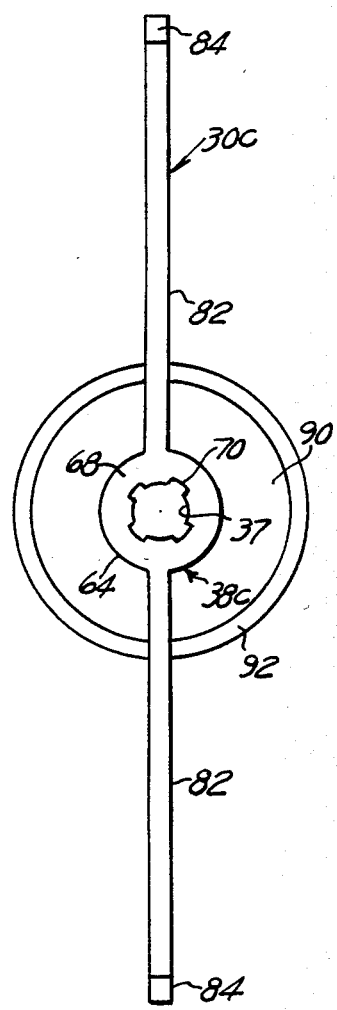
FIG. 19 is a rear elevation view thereof.

As illustrated at FIGS. 17-19, restraining straps of the type disclosed in co-pending application Ser. No. 344,495, that is comprising a nosepiece, such as the nosepiece 38c, formed integrally with the strap 30c, may also be provided with a disc-like sealing member 90 formed integral with the nosepiece 38c and radially projecting from the cylindrical body portion 64 of the nosepiece. In the structure illustrated, the retaining strap portion 30c of the integral assembly has the general structure comprised of bands or strips 82 provided at an end each with a strut 84 engaged in an appropriate recess 86 in the flange 40 of the slave cylinder housing 32. The other end of each band or strip 82 is integrally attached to the nosepiece 38c by a weakened portion 58, for example in the form of a reduced width portion, such as to readily separate from the nosepiece upon first actuation of the slave cylinder 14. After separation of the nosepiece 38c from the bands or strips 82, the nosepiece acts as a bearing member interposed between the end 36 of the piston rod 22 and the recess 39 in the clutch release arm 28, the flexible disc-like sealing member 90 frictionally sealing the bearing surfaces against any dirt from the surroundings.

Having thus described the present invention by way of examples of structure well designed for practicing the invention, modifications whereof will be apparent to those skilled in the art,

What is claimed as new is as follows:

1. In an actuator for operation a motor vehicle clutch release arm, said arm having a partially spherical concave recess and said actuator having a linearly movable output rod, a cylindrical cap fitted on the end of said rod, a substantially hemispherical end portion on said cap for engagement in said partially spherical concave recess, and a disc-shaped flange integrally formed radially on the periphery of said cylindrical cap, said flange having an edge resiliently engaging said clutch release arm beyond the edge of said concave recess for preventing introduction of dirt in said recess.

2. The cylindrical cap of claim 1 further comprising a pair of strips symmetically arranged and each having an end attached to said cylindrical cap and means attaching the other end of each of said strips to a non-movable portion of said actuator, each of said strips having a portion of reduced strength whereby a strip is ruptured at said portion of reduced strength upon first operation of said actuator.

3. The cylindrical cap of claim 2 wherein said cylindrical cap has a pair of bifurcated ears integrally formed radially at the periphery of said cylindrical cap symmetrically on diametrically opposed locations, a recess in each of said ears, and a strut integrally formed at an end of each of said strips for engagement in said recess.

4. In combination, a shipping and installation restraining strap and an actuator having a housing and a linearly movable output member having an end projecting from said housing, said strap comprising a cylindrical cap fitted on the end of said output member and having a substantially hemispherical end portion for engagement in a partially spherical concave recess in an element operated by said actuator, a pair of strips symmetrically arranged and each attached at an end to said cylindrical cap, and means attaching the other end of each of said strips to a non-movable portion of the housing of said actuator, each of said strips having a portion of reduced strength, whereby each of said strips is ruptured at said portion of reduced strength upon first operation of said actuator.

5. The combination of claim 4 wherein said actuator is the slave cylinder of a hydraulic clutch actuating apparatus and said element operated by said actuator is a release arm for said clutch.

6. The combination of claim 5 further comprising a disc-shaped flange integrally formed radially about the periphery of said cylindrical cap, said flange having an edge resiliently engaging said clutch release arm beyond the end of said concave recess for preventing introduction of dirt in said recess.

7. In combination, a shipping and installation restraining strap and an actuator having a housing and a linearly movable output member having an end projecting from said housing, said strap comprising a retaining member engaged with the end of said output member, a pair of strips symmetrically arranged and each removably attached at an end to said retaining member, and means attaching the other end of each of said strips to a non-movable portion of the housing of said actuator, each of said strips having a portion of reduced strength whereby each strip is ruptured at said portion of reduced strength upon first operation of said actuator.

8. The combination of claim 1 wherein said strip portion of reduced strength comprises a portion of reduced width.

9. The combination of claim 1 wherein said strip portion of reduced strength comprises a portion of reduced thickness.

10. The combination of claim 3 wherein said strip portion of reduced strength further comprises a portion of reduced width.

11. The combination of claim 1 wherein said means removably attaching an end of each of said strips to said retaining member comprises a strut integrally formed at the end of each of said strips, and a bifurcated ear integrally formed at the periphery of said retaining member, said ear having a recess for engagement by said strut.

12. The combination of claim 1 wherein said means removably attaching an end of each of said strips to said retaining member comprises a radially extending flange on said retaining member and a ring integrally formed at said end of each of said strips, said ring being engaged over the periphery of said retaining member in abutment with said flange.

13. The combination of claim 1 further comprising a disc-shaped flange integrally formed radially about the periphery of said retaining member.

14. The combination of claim 1 wherein said retaining member is in the form of a cylindrical cap fitted on the end of said output member and has a substantially hemispherical end portion, and wherein said hemispherical end portion is engageable in a partially spherical concave recess of an element operated by said actuator.

15. The combination of claim 14 further comprising a disc-shaped flange integrally formed radially about the periphery of said cylindrical cap, said flange having an edge resiliently engaging said element beyond the edge of said concave recess.

* * * * *